Oct. 31, 1950     H. W. HOUSTON     2,528,366
FILM HOLDING DEVICE
Filed Aug. 2, 1946
FIG. 1.
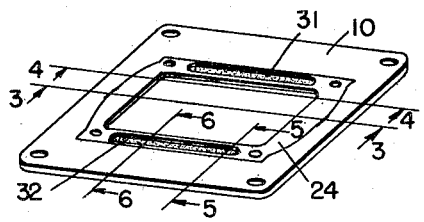
FIG. 2.
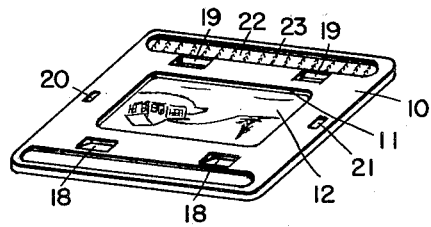
FIG. 3.
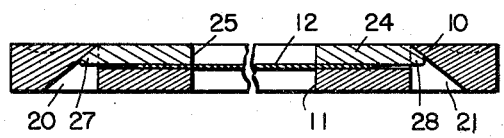
FIG. 4.
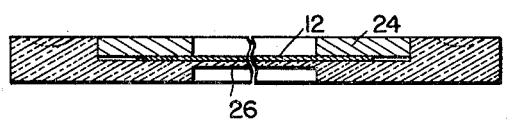
FIG. 5.
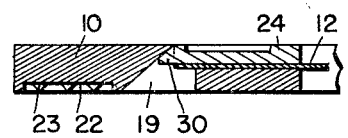
FIG. 6.
FIG. 7.
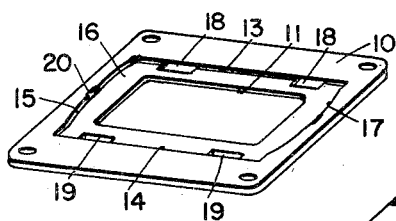
FIG. 8.
FIG. 9.
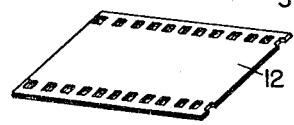
FIG. 10.
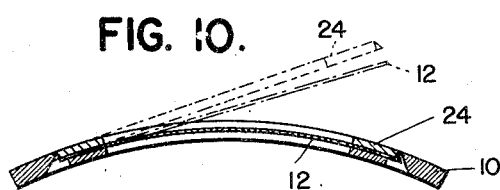
INVENTOR
HERBERT W. HOUSTON
BY *Mason & Graham*
ATTORNEYS Patented Oct. 31, 1950

2,528,366

UNITED STATES PATENT OFFICE 2,528,366

FILM HOLDING DEVICE

Herbert W. Houston, Sherman Oaks, Calif., assignor to The Houston Corporation, Los Angeles, Calif., a corporation of California Application August 2, 1946, Serial No. 687,827

9 Claims. (Cl. 40—156)

The present invention relates to a film holding device for mounting a photographic film unit or transparency, whereby the film is protected against injury, the frame with the film mounted thereon being usable as a film slide for use in projecting machines.

Various types of film holding frames or clips have been devised for use in mounting and protecting colored film transparencies against scratching and for mounting the film for use in viewers and projection machines. Most of these mounting devices are made from lightweight sheet metal or relatively stiff paper, and when a film is once mounted therein it usually is necessary to destroy the holder in order to remove the transparency therefrom. Furthermore, many of these transparency holders are difficult to handle in the darkness which usually prevails when the film is being projected onto a screen by a projection machine.

An object of the present invention is to make an improved transparency mounting device.

Another object is to make a holder for removably mounting a film transparency to protect the transparency, and to facilitate its use in a projection machine.

Another object is to make a film transparency mounting device having a resiliently bendable interlocking retaining member adapted to retain a film transparency therein.

Another object is to make a film transparency holding frame having a transparency retainer flush mounted in a recess therein, the frame and the retainer being of resiliently flexible material with interlocking means provided between the frame and the retainer, said interlocking means being adapted to release the retainer from the frame on a combined flexing of the frame and the retainer.

These and other features of the invention will be more fully set forth in the following description and the accompanying drawings, consisting of one sheet. In the drawings:

Fig. 1 is a view in perspective of a transparency holder embodying the present invention;

Fig. 2 is a view similar to Fig. 1 showing the opposite side of the holder from that illustrated in Fig. 1;

Figs. 3, 4, 5 and 6 are fragmentary sectional views taken on the lines 3—3, 4—4, 5—5 and 6—6, respectively, of Fig. 1, Fig. 4, however, showing a slightly modified type of holding frame;

Fig. 7 is a view in perspective of a film holding frame comprising one part of the holder illustrated in Fig. 1;

Fig. 8 is a view, also in perspective, showing a film retaining member adapted to be inserted in the frame shown in Fig. 7 to complete the mounting assembly illustrated in Fig. 1;

Fig. 9 is a view in perspective of the type of transparency adapted to be mounted in the holder shown in Fig. 1; and Fig. 10 is an enlarged sectional view showing the manner of flexing or bending the holder for assembly and disassembly.

Referring to the drawings in detail, the film holder comprises a rectangular film-holding frame 10 which preferably is square and of a size to be usable in a projector for displaying film transparencies. Since most present day transparency projectors have a slide slightly over two inches in height, the exterior frame 10 may be approximately two inches per side.

A film-holding frame 10 preferably is made of plastic material of a high degree of flexibility. Since many such plastics are available and are well known to the art, it will be unnecessary to enumerate them. However, it is considered preferable although not essential that the plastic material used for the frame and for the film retaining insert to be described later herein be of noninflammable material and one which will stand a temperature in the neighborhood of 150° F. without material softening. The ability to stand such heat is required only for long display use in projecting, and would not be necessary where the device is to be used only as a film holder for hand use and in viewers, and for short period use in projecting machines.

The film-holding frame 10 has a central rectangular opening 11 therein. The size of this aperture is not critical but preferably is of a width to display a major portion of the exposed area of a transparency 12 to be mounted therein. The size of the device may be varied to fit any desired size of transparency or sheet.

The upper face of the film-holding frame 10 illustrated in Fig. 7 is recessed as at 16 about the marginal edge of the opening 11, sides 13 and 14 of the recess 16 being straight and the ends 15 and 17 thereof being curved outwardly slightly, as illustrated.

A pair of elongated rectangular holes 18 and 19 are provided on the marginal edge of each side of the recess 16, these holes extending through the frame 10 and having their outer edges sloped outwardly as best illustrated in Figs. 5 and 7 to form undercut notches in the side walls of the recess 16. A pair of similar but smaller holes 20 and 21 are provided in the center of each end of the recess. It will be apparent to those familiar with the art of injection molding that the purpose of the holes 18, 19, 20 and 21 is to permit withdrawal of the die members, not shown, since it is the undercut notches in the side walls of the recess which act to hold a film-retaining member in the recess, as will be brought out later in the present description of the invention.

The recess 16 between the sides 13 and 14 thereof is of a width to receive a film transparency 12 therein and is of a length slightly greater than the length of the opening 11. The transparency is mounted with its emulsion side down in the recess 16, and with the bottom of the picture on the transparency toward the top of the frame. This manner of mounting the transparency insures that it will be projected right side up on the screen since it is reversed in the projecting process. Furthermore, by thus mounting the transparency, if it is inserted in the projector slide with the emulsion side of the transparency toward the screen, the right-hand side of the subject will appear as the right-hand side of the picture, which, of course, is the desirable manner of projection.

Since pictures frequently are projected in substantial darkness, it is desirable for the operator of the projection machine to be able to determine without looking at it, the proper position of the picture and its holder for insertion in the slide of the projector. In order to permit the operator thus to determine the proper positioning of the picture in the projector, a shallow recess 22 (see Figs. 2 and 5) having a plurality of projecting points 23 therein is provided along the upper edge of the frame 10 on the opposite side thereof from the recess 16. These points by their rough feel to the finger of an operator are easily detected even in darkness. By inserting the frame with this roughened portion in a predetermined position, the transparency will be inserted properly in the projecting machine.

A film-retaining member 24 is shaped to fit rather closely in the recess 16, the retaining member being of the same thickness as the depth of the recess, less the thickness of the transparency 12. Thus, when the retaining member 24 is mounted in the recess 16, as illustrated in Figs. 1 and 3-6, inclusive, the top of the retaining member will lie flush with the top of the film-holding frame 10. The retaining member 24 has a rectangular opening 25 therein which may be of the same size and shape as the rectangular opening 11 in the film-holding frame 10. The opening 25 is positioned to register with the frame opening 11 when the retaining member is in position in the recess 16.

The retaining member 24 has a pair of projections 27 and 28 on the center of each end thereof adapted to register with the undercut notches formed by the outwardly sloping outer sides of the holes 20 and 21 in the end walls of the recess 16. A pair of lateral projections 29 and 30 also are provided on each side of the retaining member to register with the notches formed in the side walls of the recess 16 by the outwardly sloping outer sides of the holes 18 and 19 in the margin of the recess 16. The outer faces of all of these projections on the retaining member 24 are beveled to coincide with the slope of the outer faces of the recesses or holes with which they are adapted to register.

The transverse width of the retaining member 24, plus the projections, is greater than that of the recess 16 in the film-holding frame 10 when both members are flat. However, by inserting the projections 29 on one edge of the retaining member in the notches provided by the sloping outer faces of the holes 18, and then flexing both the film-holding frame 10 and the retaining member 24 to a curved shape substantially as illustrated in Fig. 10, the curvilinear distance between the upper outer edges of the recess is increased, while the curvilinear distance between the outer edges of the projections 29 and 30 on opposite sides is decreased. Therefore, when thus flexed the projections 29 and 30 may be readily snapped into position in their corresponding notches, whereupon the combined frames may be released to permit the flexibility of the frames to restore them to the flat condition shown in Figs. 1-8, inclusive. The end projections 27 and 28 also can be snapped into their respective notches in a similar manner by bending the frame 10 and the member 24 transversely to the first bending. This effectively locks the frame 10 and retaining member 24 in such assembled relation with the transparency 12 firmly held between them. To remove the retaining member 24 from the frame 10 the parts may again be bent to the curved position illustrated in Fig. 10, whereupon the projections on the sides and ends of the retaining member 24 will disengage from the notches in the film-holding frame 10 to release the retainer 24 from the frame.

If desired, a transparent protecting sheet, as indicated by the numeral 26 in Fig. 4, may be molded integrally with the frame 10 to cover the opening 11 therein. Such a sheet protects the emulsion side of the transparency and, if made of clear transparent material such as clear plastic, no substantial interference with the projection of the picture is caused thereby. By making either the frame 10 or the retaining member 24 of clear transparent material, and by making the other of these members of opaque material, a framing effect still will be accomplished for projection purposes. A transparent protecting sheet such as that indicated by the numeral 26 in Fig. 4, in such instance, can then be molded integrally with the body portion of the member thus molded of clear transparent material.

A pair of shallow marking recesses 31 and 32 are provided, one on each of the marginal side portions of the retaining member 24. The bottom surfaces of these recesses may be sandblasted or otherwise roughened so as to provide a toothed surface which permits writing data such as film number and series designation thereon.

The device comprises a simple, decorative and inexpensive transparency holder and one which is capable of numerous mountings and removals of transparencies without adversely affecting the device. Furthermore, it provides for mounting the transparencies with no scratching or marring of the delicate surfaces and permits ready identification of the proper position of the picture for use in a viewer or projection machine.

It will be apparent to those familiar with the art that the device is capable of numerous modifications without departing from the spirit of the invention. It is desired, therefore, not to limit the invention except as defined in the following claims.

I claim:

1. A mounting device for a film transparency comprising a rectangular holding frame having a central opening therein, said frame having a marginal recess surrounding said opening, to receive a film transparency therein, and a retaining member adapted to fit into said recess to overlie the transparency in said recess, said retaining member having a plurality of marginal projections on a plurality of edges thereof, said frame having portions thereof adjacent the edge of said recess adapted to overlie the projections on said retaining member to hold said retaining member in said recess, said retaining member and said frame being resiliently flexible for transverse bending to release said marginal projections from beneath said overlying frame portions.

2. A mounting device for a film transparency comprising a rectangular holding frame having a central opening therein, said frame having a marginal recess surrounding said opening, to receive a film transparency therein, and a retaining member adapted to fit into said recess to overlie the transparency in said recess, said frame having portions thereof adjacent the edge of said recess adapted to overlie a marginal edge portion of said retaining member to hold said retaining member in said recess, said retaining member and said frame being resiliently flexible for combined transverse bending to release said marginal edge portions of said retaining member from said overlying frame portions.

3. A mounting device for a film transparency comprising a rectangular holding frame having a central opening therein, said frame having a marginal recess surrounding said opening, to receive a film transparency therein, and a retaining member adapted to fit into said recess to overlie the transparency in said recess, said retaining member having a beveled marginal edge portion, said frame having a beveled undercut wall portion in a wall of said recess adapted to overlie the beveled marginal edge portion of said retaining member to wedge said retaining member into said recess, said retaining member and said frame being resiliently flexible for transverse bending to release said beveled edge portion from said beveled undercut wall portions.

4. A mounting device for a film transparency comprising a rectangular holding frame, said frame having a recess in a side thereof adapted to receive a film transparency therein, and a retaining member adapted to fit closely into said recess to overlie a transparency in said recess, said holding frame and said retaining member having relatively interfitted portions adjacent the marginal edge of said recess to hold said retaining member in said recess, said retaining member and said frame being resiliently flexible for transverse bending to release said relatively interfitted portions from holding condition.

5. A film mounting device comprising a normally flat resiliently flexible frame having a film holding surface, an undercut wall portion laterally adjacent said surface, and a flexible retaining member mounted in film retaining position over said surface, said retaining member having a marginal edge portion thereof retained beneath said undercut wall portion, said frame and said retaining member being jointly bendable to move the undercut wall portion relatively outward from the retaining member edge portion thereby to release said retaining member.

6. A film mounting device comprising a flat resiliently flexible frame having a recessed film mounting surface, an undercut side portion laterally adjacent said surface, and a flexible retaining member mounted in film retaining position over said surface, said retaining member having a marginal edge portion thereof retained beneath said undercut side portion, said frame and said retaining member being jointly bendable to move the undercut side portion relatively outward from the retaining member edge portion thereby to release said retaining member, at least one of said members being of opaque material and having a film display opening substantially centrally thereof.

7. A film mounting device comprising a flat resiliently flexible frame having a recessed film mounting surface, a wall portion laterally adjacent each of two opposite sides of said surface and a flexible retaining member mounted in film retaining position over said surface, said retaining member having two opposite interlocking marginal edge portions thereof positioned laterally adjacent to, and in interlocking engagement with, said side portions, said frame and said retaining member being jointly bendable to move said wall portions relatively outward from the interlocking marginal edge portions thereby to release said retaining member.

8. A releasable film transparency mounting device comprising a film holding frame of resiliently flexible plastic material, one face of the frame having a recess therein, of a width and length to receive a film transparency thereon, an undercut notch in each of opposite side walls of the recess, said notches having overlying walls adjacent to the recessed face of the frame such that the distance of separation along curvilinear lines between the inner edges of the overlying walls of said notches increases as a result of bending the frame convexly to the recess to cause it to assume such curvilinear lines, a film retaining member of a plastic material of approximately the same resilient flexibility as that of the said frame adapted to fit closely in the recess to overlie a film therein, the retaining member having lateral projections thereon of a length to be overlaid by the inner edges of said overlying walls of said notches when the frame and retaining member are flat, and to be cleared by said inner edges of the overlying walls of said notches as a result of said frame and retaining member being bent convexly to the recessed side of said frame to a radius of curvature sufficiently small to increase said distance of separation of said inner edges of the upper walls of the undercut notches along curvilinear lines sufficiently to effect said clearance.

9. A releasable film transparency mounting device comprising a film holding frame of resiliently flexible plastic material, one face of the frame having a recess therein of a width and length to receive a film transparency thereon, an undercut notch in each of opposite side walls of the recess, said notches having overlying walls adjacent to the recessed face of the frame such that the distance of separation along curvilinear lines between the inner edges of the overlying walls of said notches increases as a result of bending the frame convexly to the recess to cause it to assume such curvilinear lines, a film retaining member of a plastic material of approximately the same resilient flexibility as that of the said frame adapted to fit closely in the recess to overlie a film therein, the retaining member having lateral projections thereon of a length to be overlaid by the inner edges of the overlying walls of said notches when the frame and retaining member are flat, and to be cleared by said inner edges of said walls of said notches as a result of said frame and retaining member being bent convexly to the recessed side of said frame to a radius of curvature sufficiently small to increase said distance of separation of said inner edges of the overlying walls of the undercut notches along curvilinear lines sufficiently to effect said clearance, the engaging faces of said projections and of said overlying walls of said notches being beveled to exert a camming action on the film retaining member when the frame and film retaining member are flat to urge the film retaining member downwardly against a film in said recess.

HERBERT W. HOUSTON.

REFERENCES CITED

The following references are of record in the file of this patent:

UNITED STATES PATENTS

| Number | Name | Date |
|---|---|---|
| 1,317,946 | Snively | Oct. 7, 1919 |
| 1,567,310 | Weeks | Dec. 29, 1925 |
| 1,633,376 | Freeman | June 21, 1927 |
| 1,733,215 | Barry | Oct. 29, 1929 |
| 1,738,054 | Hill | Dec. 3, 1929 |
| 1,904,318 | Lehere | Apr. 18, 1933 |
| 1,943,673 | Hudson | Jan. 16, 1934 |
| 2,176,283 | Whiteford | Oct. 17, 1939 |
| 2,362,434 | Fitch et al. | Nov. 7, 1944 |

UNITED STATES PATENT OFFICE
CERTIFICATION OF CORRECTION

Patent No. 2,528,366            October 31, 1950

Herbert W. Houston

It is hereby certified that error appears in the above numbered patent requiring correction and that the said Letters Patent should read as corrected below.

Column 7, after line 14, insert the following claim:

10. A film transparency mounting device comprising a resiliently flexible frame member having a central film display area adapted to be covered by a film transparency, a resiliently flexible film retaining member adapted to be mounted over a film transparency on said frame, said film retaining member having a central film display area overlying that in said frame, a plurality of lateral projections on one of said members, and a plurality of corresponding lateral recesses in the other of said members, said projections having snap fastening engagement with said recesses to secure said member together in film gripping relation to each other, said projections being relatively displaceable laterally out of snap fastening engagement with said recesses by a bending of said members in a predetermined direction.

in the heading to the printed specification, line 7, for "9 Claims" read -- 10 Claims --.

Signed and sealed this 10th day of October 1961.

(SEAL)
Attest:

ERNEST W. SWIDER
Attesting Officer

DAVID L. LADD
Commissioner of Patents